(12) United States Patent  (10) Patent No.: US 7,675,871 B2
Garney et al.  (45) Date of Patent: *Mar. 9, 2010

(54) SPLIT TRANSACTION PROTOCOL FOR A BUS SYSTEM

(75) Inventors: John I. Garney, Portland, OR (US); John S. Howard, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1574 days.

This patent is subject to a terminal disclaimer.

(21) Appl. No.: 10/939,365

(22) Filed: Sep. 14, 2004

(65) Prior Publication Data

US 2005/0033892 A1    Feb. 10, 2005

Related U.S. Application Data

(63) Continuation of application No. 09/362,991, filed on Jul. 27, 1999, now Pat. No. 6,813,251.

(51) Int. Cl.
H04L 12/28    (2006.01)

(52) U.S. Cl. .................. 370/257; 370/252; 370/352; 370/463; 370/466; 709/253; 710/105

(58) Field of Classification Search .................. 370/252, 370/257, 352, 463, 466; 709/253; 710/105
See application file for complete search history.

(56) References Cited

U.S. PATENT DOCUMENTS

| | | | |
|---|---|---|---|
| 4,819,229 A | 4/1989 | Pritty et al. | 370/89 |
| 5,291,614 A | 3/1994 | Baler et al. | 395/800 |
| 5,469,435 A * | 11/1995 | Krein et al. | 370/462 |
| 5,553,310 A * | 9/1996 | Taylor et al. | 710/40 |
| 5,564,114 A | 10/1996 | Popat et al. | 710/105 |
| 5,594,882 A * | 1/1997 | Bell | 711/212 |
| 5,630,174 A | 5/1997 | Stone et al. | 710/63 |
| 5,687,388 A * | 11/1997 | Wooten et al. | 710/3 |
| 5,694,555 A | 12/1997 | Morriss et al. | 395/280 |
| 5,699,516 A * | 12/1997 | Sapir et al. | 710/110 |
| 5,708,794 A | 1/1998 | Parks et al. | 395/481 |
| 5,819,111 A | 10/1998 | Davies et al. | 395/849 |
| 5,838,991 A | 11/1998 | Shipman | 395/838 |
| 5,870,567 A | 2/1999 | Hausauer et al. | 710/310 |
| 5,875,313 A | 2/1999 | Sescila, III et al. | |
| 5,890,015 A | 3/1999 | Garney et al. | 395/882 |
| 5,915,087 A | 6/1999 | Hammond et al. | 395/187.01 |
| 6,046,762 A | 4/2000 | Sonesh et al. | 348/16 |
| 6,067,591 A | 5/2000 | Howard et al. | |
| 6,098,134 A | 8/2000 | Michels et al. | 710/108 |

(Continued)

OTHER PUBLICATIONS

XP-002144837; IEEE Std. 1394-1995, pp. 19-47.

Primary Examiner—William Trost, IV
Assistant Examiner—Toan D Nguyen
(74) Attorney, Agent, or Firm—Kenyon & Kenyon LLP

(57) ABSTRACT

A method of and apparatus for communicating between a host and an agent. The method includes the step of performing a first transaction between a host controller and a hub. The hub is operable to perform a single transaction with an agent based on the first transaction. The method then includes the step of performing a second transaction between the host controller and the hub. The second transaction is based on the single transaction.

15 Claims, 11 Drawing Sheets

U.S. PATENT DOCUMENTS

| | | | |
|---|---|---|---|
| 6,098,137 A | 8/2000 | Goodrum et al. | 710/311 |
| 6,145,039 A * | 11/2000 | Ajanovic et al. | 710/105 |
| 6,266,731 B1 | 7/2001 | Rilei et al. | 710/129 |
| 6,272,499 B1 | 8/2001 | Wooten et al. | 707/102 |
| 6,483,839 B1 | 11/2002 | Gemar et al. | 370/395 |
| 6,701,399 B1 | 3/2004 | Brown | 710/114 |
| 7,349,391 B2 * | 3/2008 | Ben-Dor et al. | 370/392 |
| 7,505,455 B1 * | 3/2009 | Goodwin et al. | 370/356 |
| 2003/0005182 A1 | 1/2003 | Leete et al. | 710/1 |

\* cited by examiner

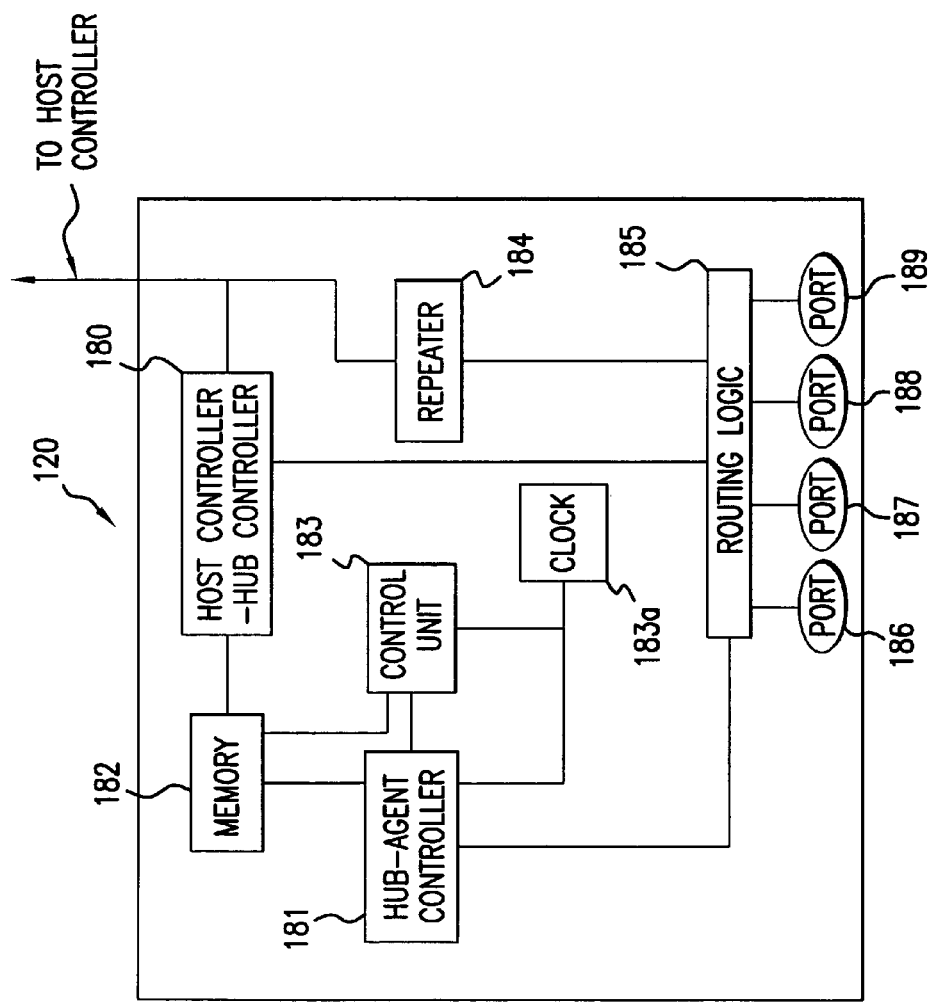

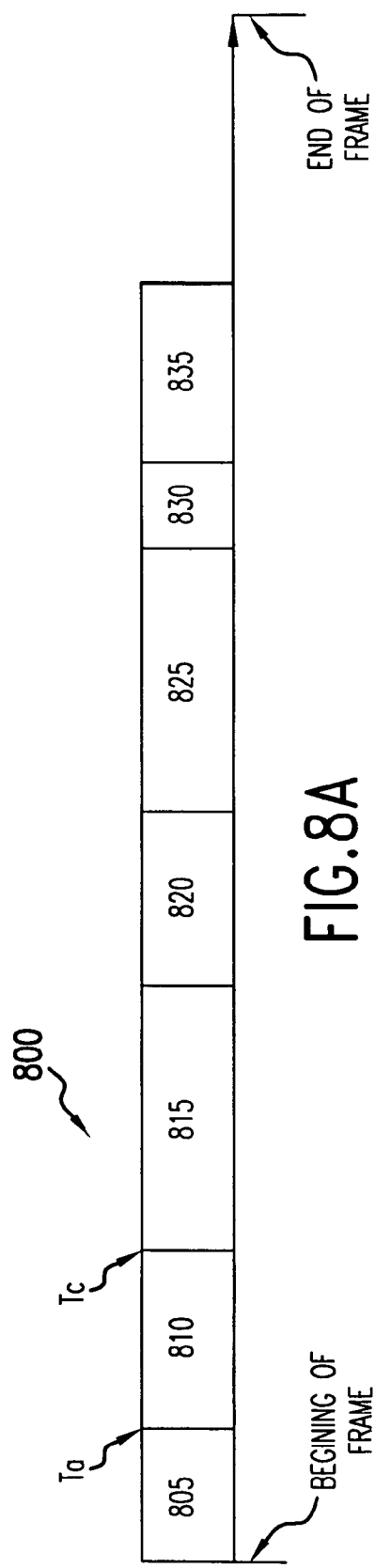

SPLIT TRANSACTION PROTOCOL FOR A BUS SYSTEM

RELATED APPLICATIONS

This application is a continuation of U.S. patent application Ser. No. 09/362,991 filed Jul. 27, 1999 now U.S. Pat. No. 6,813,251 and entitled "SPLIT TRANSACTION PROTOCOL FOR A BUS SYSTEM."

FIELD OF THE INVENTION

The present invention pertains to the field of data communication in a digital system. More particularly, the present invention relates to methods or protocols for transferring information on a bus.

BACKGROUND OF THE INVENTION

A computer or similar device typically has a bus that connects devices to the computing system. Due to a variety of advances (e.g., computing power) in computing systems and devices, the amount of data that can be exchanged between a computing system and its attached devices has increased, requiring a concomitant increase in the bandwidth of the bus. Part of this increased demand for bandwidth has come from multimedia applications that require data to be transferred at regular time intervals (isochronous) either from the device to the computing system (in) via the bus, or in the opposite direction (out). Examples of devices requiring significant bandwidth, include cameras, compact disc players, speakers, microphones, video display devices, scanners, and joysticks and mice, among other devices. The bandwidth available on a bus architecture is partly determined by three factors: transmission medium, topology, and the protocol used to control access to the medium. The protocol and topology partly determine the nature of the relationship between a device and a computing system. One possible relationship is a master-slave relationship. In a master-slave relationship the computing system initiates typically all data transactions between the computing system and a device; i.e., the device only responds to requests from the computing system but never initiates a transaction. A benefit of the master-slave relationship is a bus architecture having relatively low cost and simplicity. The Universal Serial Bus (USB) Specification Revision 1.1, Sep. 23, 1998, is an example of a popular bus architecture having a master-slave relationship between elements connected by the bus. Unfortunately, many of today's devices and computing systems have bandwidth requirements (or data rates) that cannot be supported by existing master-slave bus standards, such as the USB Standard.

Even though USB does not support relatively high data rates, it has a relatively large base of users, and supports two data rates: 12 Mb/s ("full-speed") and 1.5 Mb/s ("low-speed"). USB allows multiple data rates on a bus because some devices do not require high data rates and can achieve significant cost savings by taking advantage of relatively low-cost, low data-rate drivers and cabling.

However, the USB protocol that allows the computing system to communicate at low-speed with low data rate devices and alternatively at full-speed with high data rate devices (speed-shifting) results in the amount of data actually transmitted over the bus (effective throughput) being less than that achievable by limiting the bus to full-speed transactions. In other words, speed shifting results in less bandwidth being available for higher speed (e.g., full-speed) devices, especially when there is a relatively large number of low-speed devices attached to the computing system. The effect of speed shifting on throughput is exacerbated where the ratio of high data rate to low data rate is relatively large.

Another possible bus protocol would require the host to (1) transmit at a high data rate a packet to a hub, (2) wait for the hub to forward at the low data rate the packet to the agent, (3) wait for the agent to respond at the low data rate to the hub, and (4) receive from the hub at a high data rate the agent's response to the packet. When the ratio of the high data rate to the low data rate is relatively large, this bus protocol may also result in a low effective throughput or bandwidth because of the need to wait for the hub to forward the packet at the low data rate and for the agent to respond at the low data rate.

Another popular bus technology is defined by "Firewire" or Institute of Electrical and Electronics Engineers (IEEE) Standard 1394 for a High Performance Serial Bus, 1995. EEEE 1394 supports multiple data rates, up to 400 Mb/s. While the aggregate bandwidth is substantially higher than USB, IEEE 1394 employs wasteful speed shifting and is a relatively costly technology.

The performance of a bus can be significantly affected by speed-shifting, waiting for a hub to perform transactions at a lower data rate than a host data rate, and the ratio of the host's data rate to the agent's data rate. Thus, it is desirable to have a protocol that allows communication at the higher data rates required by today's bandwidth intensive systems while allowing backward compatibility with pre-existing solutions, such as USB, and without having to pay the penalties imposed by speed-shifting and the other disadvantages of the prior art.

One issue faced by high data rate systems communicating with low data rate devices has been described above. Another issue faced by computing systems arises from the multiplicity of bus protocols (or standards) that are available. Typically, a device manufactured to operate in accordance with a bus protocol will not operate in accordance with a different bus protocol. It may be wasteful to require a user to own largely duplicate devices simply because of differences in the protocol. Where there is a large base of devices being used that have a significant economic life, it may be desirable to allow such devices to be used with a computing system that has a protocol that provides backward compatibility to the protocol of the legacy devices.

SUMMARY OF THE INVENTION

According to an embodiment of the invention a method for communicating data between a host and an agent is described. The method includes the step of performing a first transaction between a host controller and a hub. The hub is operable to perform a single transaction with an agent based on the first transaction. The method then includes the step of performing a second transaction between the host controller and the hub. The second transaction is based on the single transaction.

BRIEF DESCRIPTION OF THE DRAWINGS

The present invention is illustrated by way of example, and not limitation, in the figures of the accompanying drawings in which like references denote similar elements, and in which:

FIG. 1e illustrates a hub in accordance with the present invention;

FIGS. 8a & 8b illustrate best case and worst case frames for data transfers in accordance with the present invention.

DETAILED DESCRIPTION

A method and apparatus for communicating between a host and a peripheral (agent) is described, where the agent communicates at a different speed and/or protocol than the host. In the following description, for purposes of explanation, numerous specific details are set forth in order to provide a thorough understanding of the present invention. It will be evident, however, to one skilled in the art that the present invention may be practiced in a variety of bus systems, especially serial buses, without these specific details. In other instances well known operations, steps, functions and devices are not shown in order to avoid obscuring the invention.

Parts of the description will be presented using terminology commonly employed by those skilled in the art to convey the substance of their work to others skilled in the art, such as device or controller drivers, bus or host controllers, hubs, bus agents or agents, and so forth. Also, parts of the description will also be presented in terms of operations performed through the execution of programming instructions or initiating the functionality of some electrical component(s) or circuitry, using terms such as, performing, sending, processing, packaging, scheduling, transmitting, configuring, and so on. As well understood by those skilled in the art, these operations take the form of electrical or magnetic or optical signals capable of being stored, transferred, combined, and otherwise manipulated through electrical components.

Various operations will be described as multiple discrete steps performed in turn in a manner that is most helpful in understanding the present invention. However, the order of description should not be construed as to imply that these operations are necessarily performed in the order that they are presented, or even order dependent. Lastly, repeated usage of the phrases "in one embodiment," "in an embodiment," "an alternative embodiment," or "an alternate embodiment" does not necessarily refer to the same embodiment, although it may.

Figure 1A:
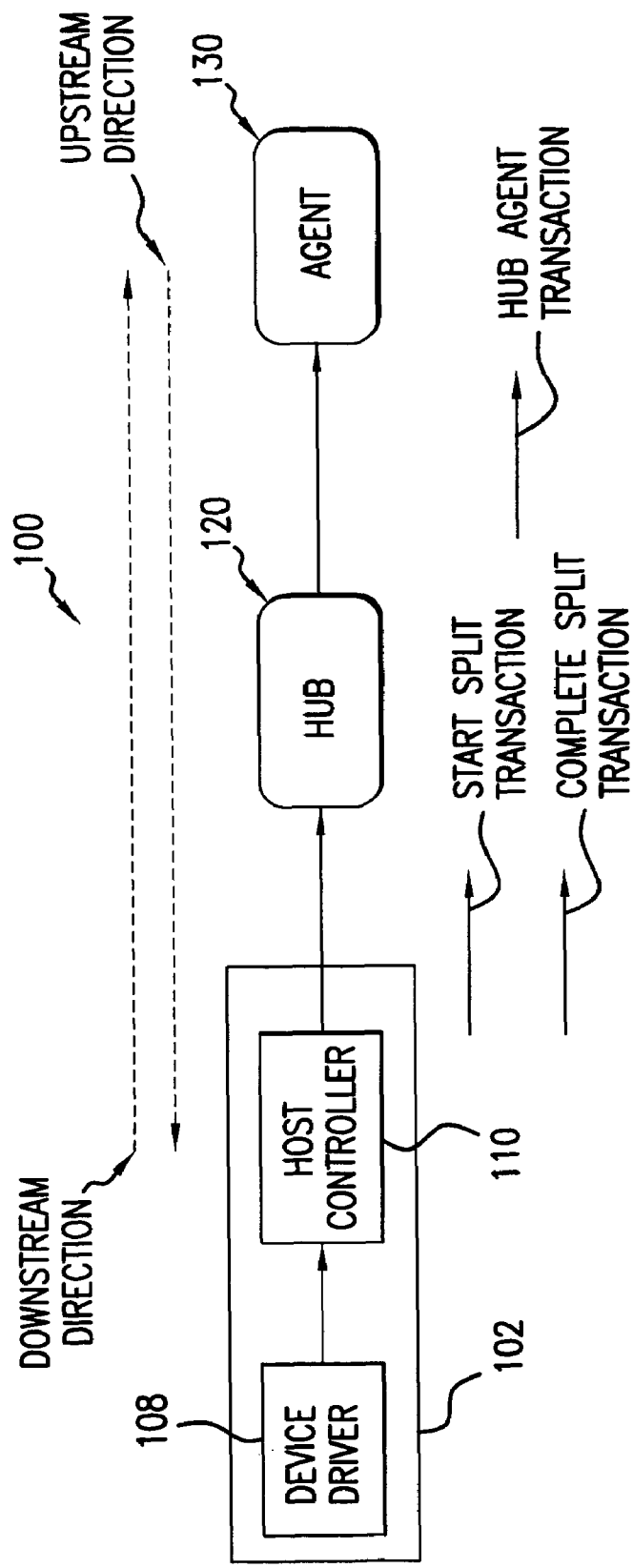
FIGS. 1a illustrates a block diagram of a digital system using a protocol in accordance with the present invention.

FIG. 1a illustrates a block diagram of a bus using a protocol in accordance with the present invention. Bus 100 includes a system 102 having a host controller 110 which is coupled to hub 120 which is in turn coupled to agent 130. Host controller 110 has an associated device driver 105 that executes on system 102. Examples of agents include cameras, compact disc players, speakers, microphones, video display devices, scanners, and joysticks and mice, among other devices. System 102 can include any digital system capable of digital communication, especially laptop computers, desktop computers, servers, set-top boxes, entertainment systems, and game machines. Consequently, this invention can be practiced with a variety of digital devices using digital communication.

Two arrows 101a and 101b are drawn in FIG. 1a to provide a frame of reference as to the direction of communication among the host, hub and agent. The direction from the agent to the hub and on to the host is referred to as the upstream direction or upstream (in). The direction from the host to the hub and on to the agent is referred to as the downstream direction or downstream (out).

Host controller driver 105 facilitates communications or transactions between along bus 100 (e.g., on behalf of an application executing on system 102) by processing packets of information destined for agent 130 and scheduling the packets for transmission by controller 110. Host controller 110 sends data to and receives data from agent 130 data via hub 120. Agent 130 communicates at a different or lower data rate (agent data rate) than the data rate of host controller 110 (host data rate). While only one agent is shown coupled to hub 120, it should be apparent that additional agents (not shown) can be attached to hub 120 or to other hubs (not shown). These additional agents may communicate at the host data rate or the agent data rate. Furthermore, while agent 130 is shown coupled to hub 120, it may be coupled to hub 120 through at least one conventional repeater type hub that operates at the agent data rate. A conventional repeater type hub repeats signals it receives on its upstream side on its downstream ports, and vice versa. The conventional repeater type hub may in turn have one or more agents 130 attached to it.

Host controller 110 and agent 130 have a master-slave relationship which means that the host initiates typically all data transactions between the host and an agent; i.e., the agent only responds to requests from the host but never initiates a transaction. Hub 120 has store-and-forward buffers (not shown) that allow hub 120 to temporarily store downstream information received from host controller 110 and destined for agent 130, and to temporarily store upstream information received from agent 130 and destined for host controller 110.

Since agent 130 and host controller 110 communicate at different data rates, it is desirable to enhance the effective throughput on the bus by providing a protocol that would allow host controller 110 to both (1) communicate at its higher data rate and (2) not have to wait for responses from agent 130 before engaging in another transaction. The protocol of the present invention allows host controller 110 to take advantage of the store-and-forward characteristic of hub 120 to allow the host controller 110 to communicate at its higher data rate and to engage in another transaction instead of waiting for a response from agent 130, if a response is required. The protocol of the present invention also provides robustness and reliability to transactions performed between controller 110 and hub 120. Additionally, the host controller and/or hub of the present invention allow increased effective throughput on the bus and provide increased responsiveness to agents (not shown) that communicate at the host data rate and that are attached to hub 120 or other hubs.

Figure 1B:
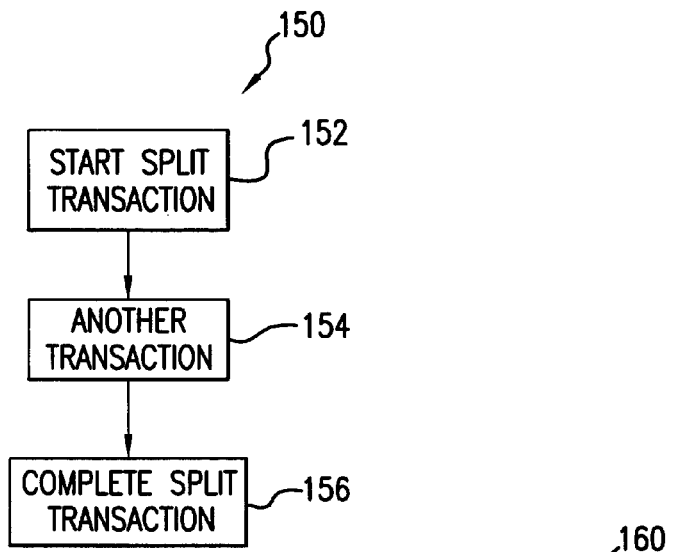
FIGS. 1b, 1c & 1d each illustrates a process showing a method in accordance with this invention for communicating between a host controller and a hub.

FIG. 1b illustrates a process 150 showing a method in accordance with this invention for communicating with an agent having a lower (or different) data rate, than the data rate of a host controller. The agent may also have a different protocol than the host controller. Process 150 can be used to effect a variety of information transfers between host controller 110 and agent 130. For ease of understanding process 150 will only be described here with regards to a bulk out transfer. However, process 150 can be used with other information transfers described herein, below. In a bulk out transfer data is transferred from host controller 110 to agent 130 via hub 120. The bulk out transfer is defined according to an embodiment of this invention as an asynchronous transfer type. However, it should not be concluded from this definition that any bulk and/or out transfer need be asynchronous.

At step 152 in process 150 a start split transaction is performed. The start split transaction communicates downstream information from host controller 110 to hub 120. Some of the downstream information communicated to hub 120 is temporarily buffered in hub 120. The buffers in hub 120 largely behave in a first-in-first-out (FIFO) manner, and are described in greater detail below. Some time after the downstream information is buffered, hub 120 performs a hub-agent transaction (not shown) with agent 130 based on some of the buffered downstream information. The relative timing of the hub-agent transaction need not be described herein because one of ordinary skill in the art would recognize that this is an application or implementation detail for which there are many possibilities. The hub-agent transaction may result in upstream information being buffered in hub 120. Some time after the downstream information is buffered, at step 156, a complete split transaction is performed. The complete split transaction communicates buffered upstream information from hub 120 to host controller 110. The relative timing of the complete split transaction need not be described herein because one of ordinary skill in the art would recognize that this is an application or implementation detail for which there are many possibilities.

A benefit of the split transaction protocol is that it allows controller 110 to initiate communication (start-split transaction) with agent 130, engage in another function, or engage in another communication with another agent (low data rate or high data rate agent) at step 154, and then return to complete the communication that was initiated earlier with the low data rate agent. By communicating using split-transactions, controller 110 communicates at high data rates without speed-shifting and does not sit idle while waiting for hub 120 to communicate with agent 130. The time that would have been spent being idle can be used to communicate with another agent. In an alternative embodiment in accordance with the present invention, controller 110 may engage in speed-shifting with some agents while engaging in split-transaction communication with other agents.

The start split and the complete split transactions (split transactions) described above may be used to implement a variety of transfer types (e.g., read or write) for communicating data between controller 110 and agent 130. In an embodiment of this invention four transfer types (or transfer requests) are defined: bulk out/in, control out/in, interrupt, isochronous. It should be apparent to one of ordinary skill in the art that the spirit and scope of this invention includes other embodiments with fewer, more or different transfer types. Each of the transfer types provides different levels of robustness, reliability, synchronization, asynchronous operation, error detection and correction of the communication flow, and other characteristics that should be apparent to one of ordinary skill in the art. For example, bulk out/in provides large asynchronous data transfers from controller 110 to agent 130 or in the opposite direction. Control out/in also provides asynchronous data transfer from controller 110 to agent 130 or in the opposite direction, but the data is typically control information used to control the operation of elements (e.g., a tape drive) in agent 130 or system 100. Interrupt provides a periodic data transfer from controller 110 to agent 130 or in the opposite direction. If the transfer is not successful, controller 110 may try again in an embodiment in accordance with this invention. Isochronous transfer provides a data transfer once every predetermined time interval. According to an embodiment of the present invention, the transfer may occur at any time during the time interval. If the transfer is not successful, controller 110 will not repeat the transfer. In an alternative embodiment in accordance with the present invention, the isochronous transfer may provide for repeat transfers.

The split transactions may include a number of phases depending on the transfer type being implemented. Each of the split transactions may have up to three phases: token, data, and handshake. However, depending on the transfer being performed, some transactions may have fewer phases. In an embodiment of the present invention, bulk and control can use the same phases in each of their respective split transactions. The phases for each of the transfer types described above are shown in Table 1, below. Presence of an "X" in a cell of the table indicates that the split transaction for the transfer type has the phase indicated at the top of the column in which the cell resides. While in this embodiment the token and data phases are separate for each of the transfer types, in alternative embodiments the token and data phases may be combined. It should be apparent that in alternative embodiments transfer types may have fewer, more, or even different phases than those shown in Table 1 without departing from the scope and spirit of the present invention.

TABLE 1

| Transfer Type | Start-Split Transaction | | | Complete-Split Transaction | | |
| --- | --- | --- | --- | --- | --- | --- |
| | Token | Data | Handshake | Token | Data | Handshake |
| Bulk-Control Out | X | X | X | X | | X |
| Bulk-Control In | X | | X | X | X | X |
| Interrupt Out | X | X | | X | | X |
| Interrupt In | X | | | X | X | |
| Isochronous Out | X | X | | | | |
| Isochronous In | X | | | X | X | |

Figure 1C:
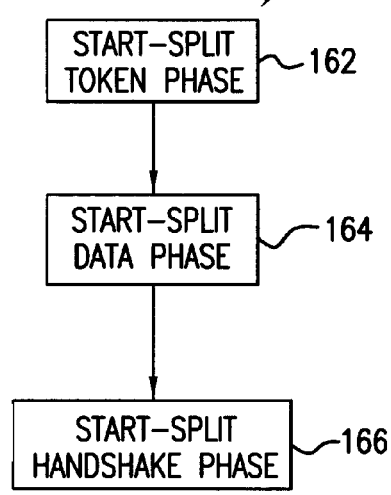

FIG. 1c illustrates in greater detail a process 160 showing a start split transaction for a bulk out transfer in accordance with an embodiment of this invention. At step 162 a token packet including hub identification information, agent and endpoint identification information, transfer type, indicator for specifying direction of transfer (in or out), and data rate identification is sent from host controller 110 to hub 120. Hub identification information, and agent and endpoint identification information, and direction are together commonly referred to here as transaction addressing information. The agent identification information identifies the particular agent with which the host is attempting to communicate. The endpoint identification information identifies a particular portion in the agent with which the host is attempting to communicate. Examples of endpoints include: left speaker and right speaker of a speaker hub, or speaker and microphone of telephone handset. The transfer type in the transaction addressing information is not limited to the types described herein (e.g., bulk out, interrupt, isochronous, control), but can include other types known in the art without departing from the spirit and scope of this invention. Data rate identification specifies the data rate with which the hub-agent transaction described in connection with process 150 above will be performed. For an embodiment in which the hub-agent transaction is performed in accordance with the USB standard, data rate identification will specify either 12 Mb/s (full-speed) or 1.5 Mb/s (low-speed). At step 164, a data packet is sent from host controller 110 to hub 120. At step 166, a first acknowledgement is received by host controller 110 from hub 120, if the data packet was decoded properly by hub 120. The first acknowledgement indicates whether the data was decoded properly by hub 120 or whether hub 120 wants to be tried later (e.g., hub 120 had full buffers and was not able to accept the data).

Figure 1D:
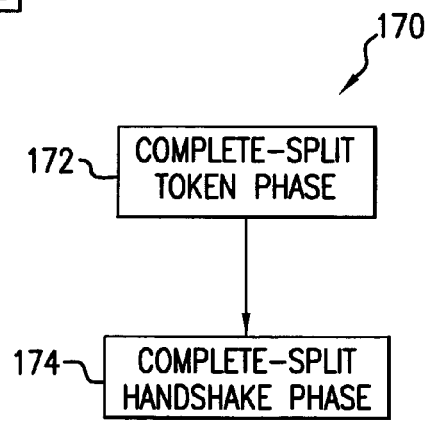

FIG. 1*d* illustrates in greater detail a process 170 showing a complete split transaction for a bulk out transfer in accordance with an embodiment of this invention. At step 172, a second token packet including transaction addressing information is sent from the host to the hub. At step 174, a second acknowledgement is received by host controller 110 from hub 120, where the second acknowledgement can either (1) include handshake information received by hub 120 from agent 130 during the hub-agent transaction described above in connection with FIG. 1*b* or (2) indicate that hub 120 does not yet have information based on the hub-agent transaction to forward to host controller 110 (e.g., the hub-agent transaction has not yet been completed). The handshake information indicates whether (1) agent 130 properly received data during the hub-agent transaction (ACK), (2) agent 130 indicated that it is not able to operate normally (STALL), or (3) agent 130 indicated that it wanted to be tried later (NAK). While the first and second acknowledgements and the handshake information have been described as specifying certain indicators, it should be apparent to one of ordinary skill in the art that these acknowledgements and handshakes and other ones described herein may represent other indications. Additionally, acknowledgements and handshakes different from or additional to the ones described herein may be added in an alternative embodiment without departing from the spirit and scope of the invention.

While the above description has generally been presented in the context of agent 130 and hub 120 communicating at a lower data rate than the data rate between hub 120 and host controller 110, those skilled in the art will appreciate that the present invention may be practiced to bridge a lower data rate to a higher data rate instead, or even equal data rates but different protocols.

While in FIG. 1 only one hub was shown in between the agent and the host there can be multiple hubs between any particular agent and the host. While only six transfer types have been described, those skilled in the art will appreciate that other types can be used without departing from the scope or spirit of this invention.

Each of FIGS. 2*a*, 2*b*, 3*a*, 3*b*, 4*a*, 4*b*, 5*a*, 5*b*, 6*a*, 6*b*, 7*a* & 7*b* illustrates a state machine diagram for performing a transfer using a host controller and a hub in accordance with this invention. Figures with an "a" as a suffix show the state machine diagram for a host controller; the state machine may be performed on host controller 110 described above in connection with FIG. 1*a*. Figures with a "b" as a suffix show the state machine diagram for a hub; the state machine may be performed on hub 120 described above in connection with FIG. 1*a*. The state machines illustrated in these figures show processes having multiple steps. It should be apparent that some of the steps may be divided into more numerous steps or combined into fewer steps without departing from the scope and spirit of this invention. The state machines are not described in great detail because their operation should be apparent to one of ordinary skill in the art. For ease of understanding, the processes performed by the state machines are not described separately. Since the processes performed by the state machines operate in tandem (i.e., each process has steps whose execution depends on the occurrence of events or steps in the other process), the description of the processes are interleaved to facilitate understanding.

Figure 2A:
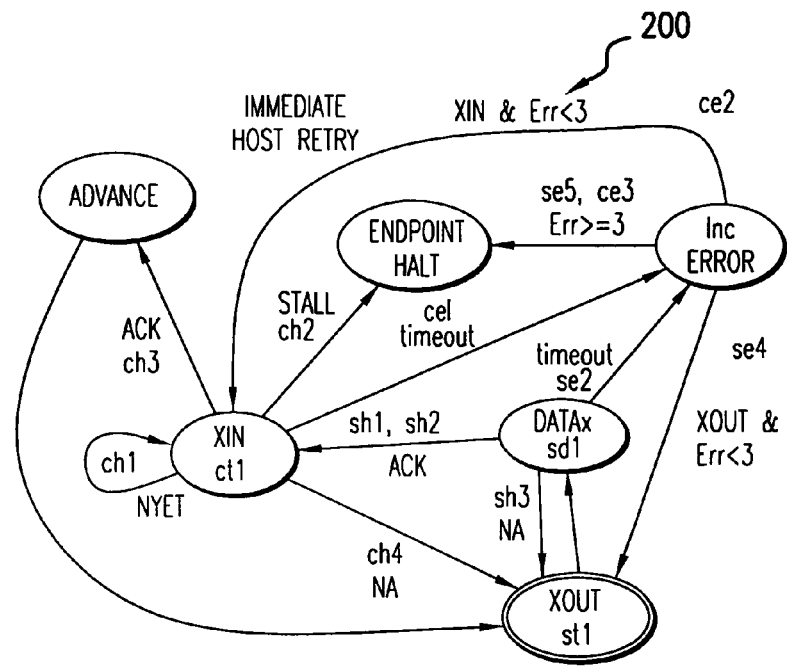
FIGS. 2a & 2b illustrate state machine diagrams for a host controller and a hub, respectively, performing a transfer in accordance with this invention.
Figure 2B:
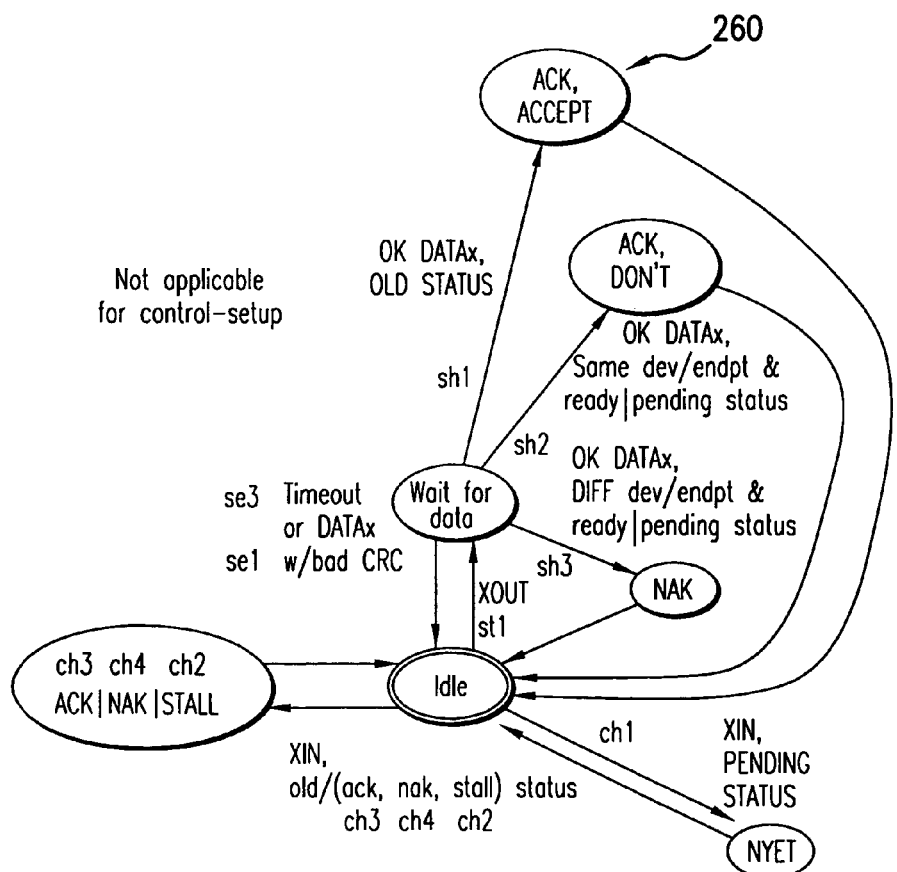

FIGS. 2*a* & 2*b* illustrate state machine diagrams for a host controller and a hub, respectively, performing a transfer in accordance with this invention, specifically a split out bulk/control transfer. Process 200 and process 260 show the state machine for a host controller and a hub, respectively. Process 200 includes start split transaction, having a token phase (XOUT) and a data phase (DATAx), which may be repeated up to three times by the host controller when timeouts occur during the phases of a transaction attempt between the host controller and the hub. In response to the start split transaction, process 260 will either propagate through states that will accept the data (ACK), respond to a host controller retry after a communication failure of a hub handshake to the host controller (ACK, don't accept data), request a host controller retry due to lack of space to hold the start transaction information (NAK), or timeout up to three times. Process 200 shows the host controller response to a complete split transaction (XIN) when the transaction between the hub and agent was successfully processed (Advance), resulted in a NAK from the agent (NAK), received an indication that the agent was not able to function normally (STALL), was not yet completed by the hub or agent (NYET), or the XIN or its response had some communication failure and resulted in up to three timeouts between the host controller and hub. In response to the complete split transaction, process 260 will either indicate that the transaction between the hub and the agent has not finished (NYET) or will provide an indication (ACK, NAK, STALL) of what transpired during the transaction between the hub and the agent.

Figure 3A:
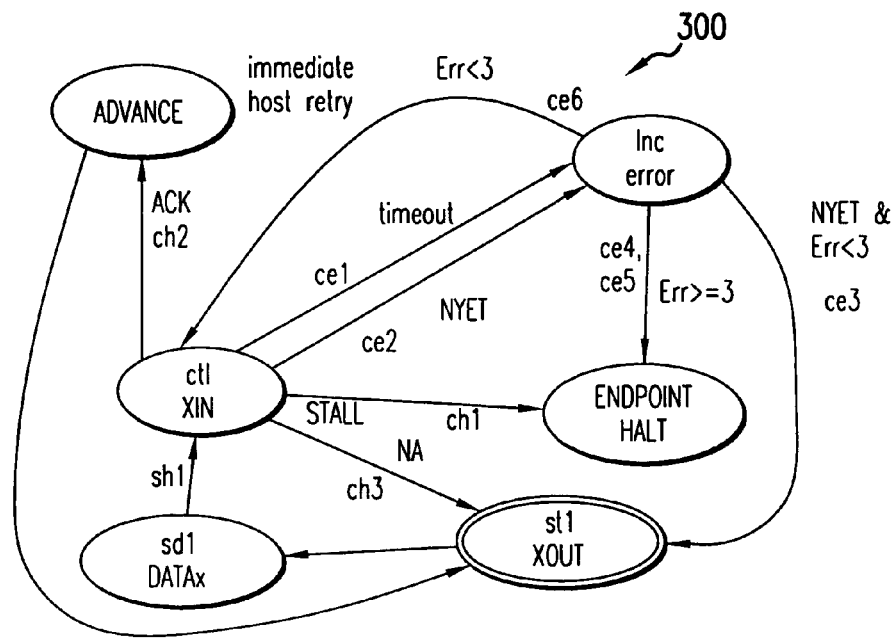
FIGS. 3a & 3b illustrate state machine diagrams for a host controller and a hub, respectively, performing another transfer in accordance with this invention.
Figure 3B:
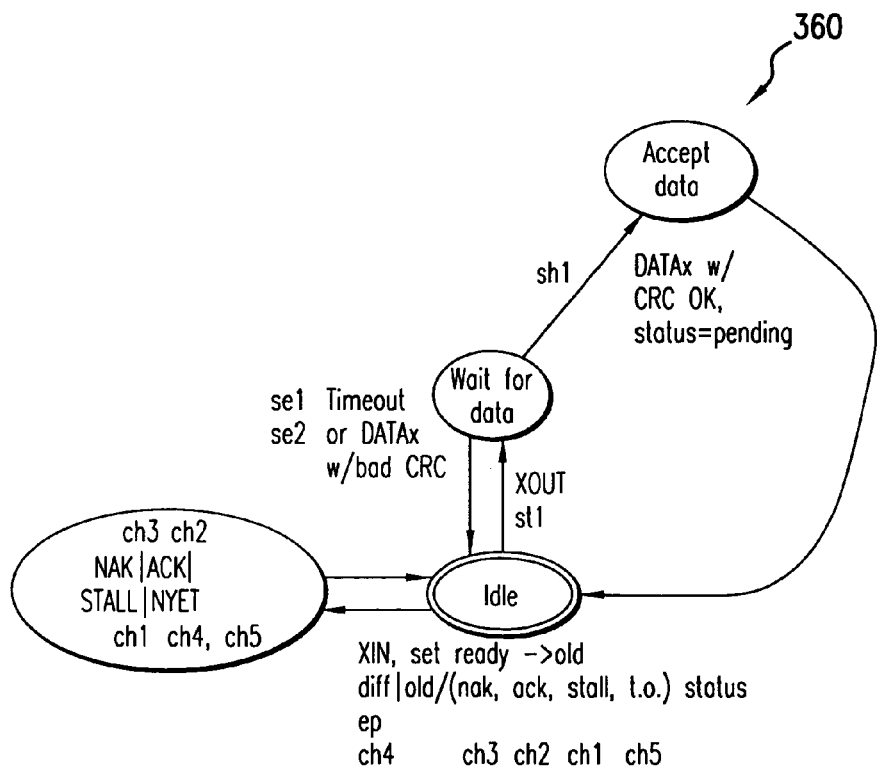

FIGS. 3*a* & 3*b* illustrate state machine diagrams for a host controller and a hub, respectively, performing another transfer in accordance with this invention, specifically a split out interrupt transfer. Process 300 and process 360 shows the state machine for a host controller and a hub, respectively. Process 300 includes a start split transaction, having a token phase (XOUT) and a data phase (DATAx), which is not repeated by the host controller because according to an embodiment the interrupt out transfer is time sensitive and need not be repeated if it is not successful on the first try. In response to the start split transaction, process 360 will either accept the data (ACK), or do nothing. Process 300 shows the host response to a complete split transaction (XIN) when the transaction between the hub and agent was successfully processed (Advance), received an indication that the agent was not able to function normally (STALL), was not yet completed by the hub or agent (NYET), or the XIN or its response had some communication failure and resulted in up to three timeouts between the host controller and hub. In response to the complete split transaction, process 360 will either indicate that the transaction between the hub and the agent has not finished (NYET) or will provide an indication (ACK, NAK, STALL, NYET) of what transpired during the transaction between the hub and the agent.

Figure 4A:
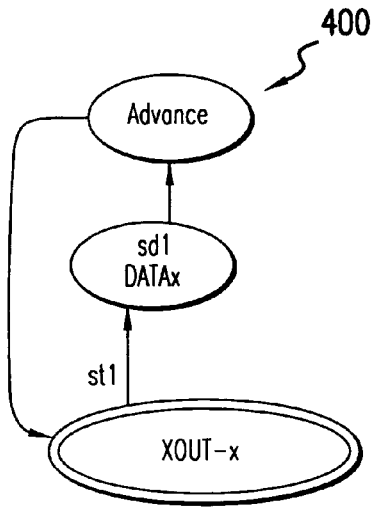
FIGS. 4a & 4b illustrate state machine diagrams for a host controller and a hub, respectively, performing another transfer in accordance with this invention.
Figure 4B:
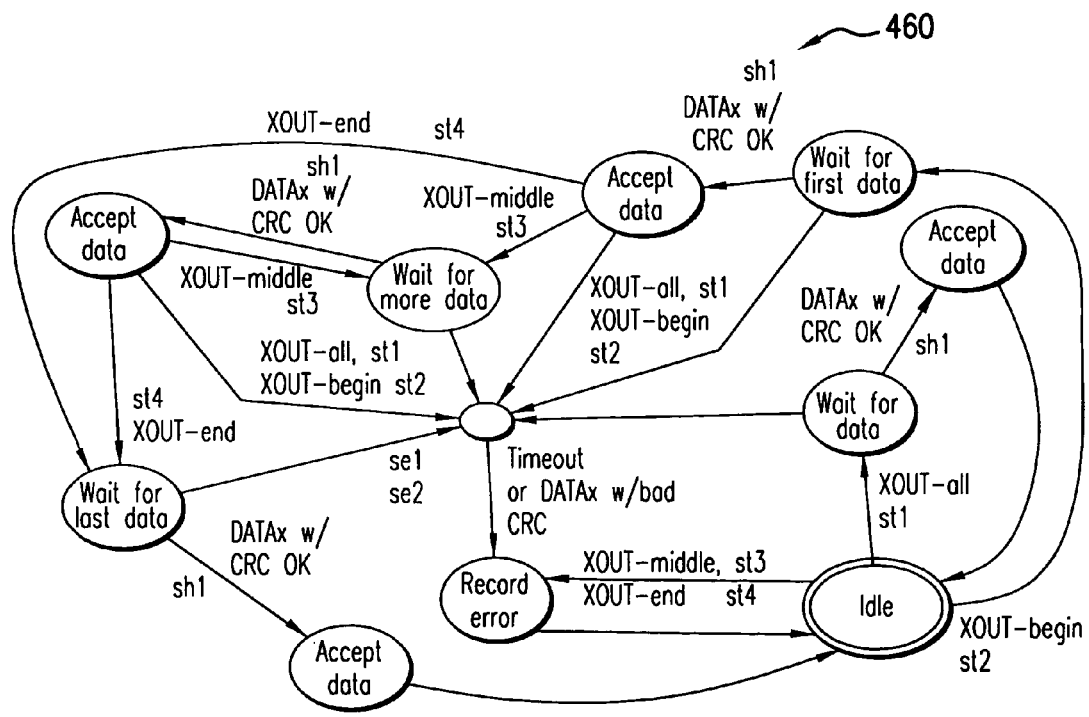

FIGS. 4*a* & 4*b* illustrate state machine diagrams for a host controller and a hub, respectively, performing another transfer in accordance with this invention, specifically a split out isochronous transfer. Process 400 and process 460 shows the state machine for a host controller and a hub, respectively. Process 400 includes a start split transaction, having a token phase (XOUT) and a data phase, neither of which is repeated. Process 400 does not include a complete split transaction according to an embodiment. Process 460 allows the hub to agent transaction data to be subdivided into multiple sections to minimize buffering required in the hub; the host controller can send the next section of data just before the hub needs to send it to the agent. In this case each split start transaction is marked with ALL, BEGIN, MIDDLE or END so that the hub can detect when a communication failure has caused it to not receive a data section in the correct sequence. In response to the start split transaction, process 460 will accumulate a data payload having one data section (ALL), two data sections (BEGIN, END), or three or more data sections (BEGIN, MIDDLE . . . MIDDLE, END).

Figure 5A:
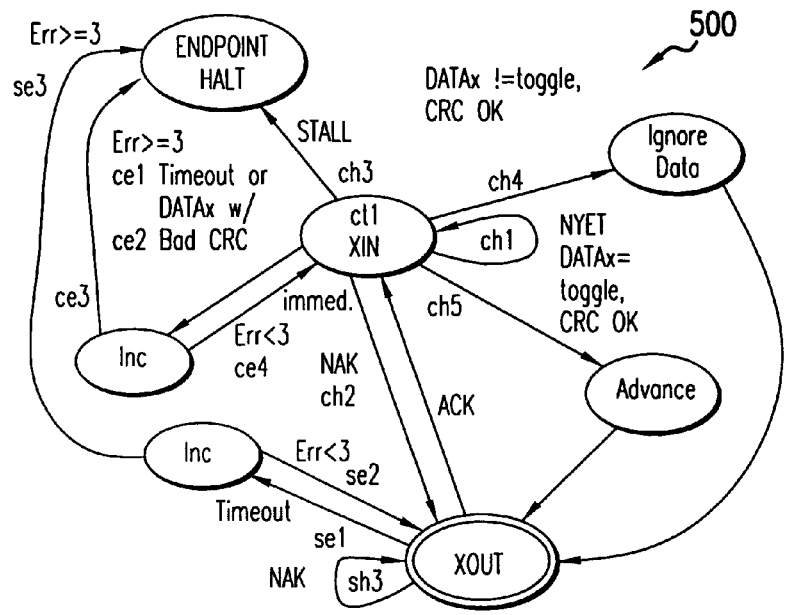
FIGS. 5a & 5b illustrate state machine diagrams for a host controller and a hub, respectively, performing another transfer in accordance with this invention.
Figure 5B:
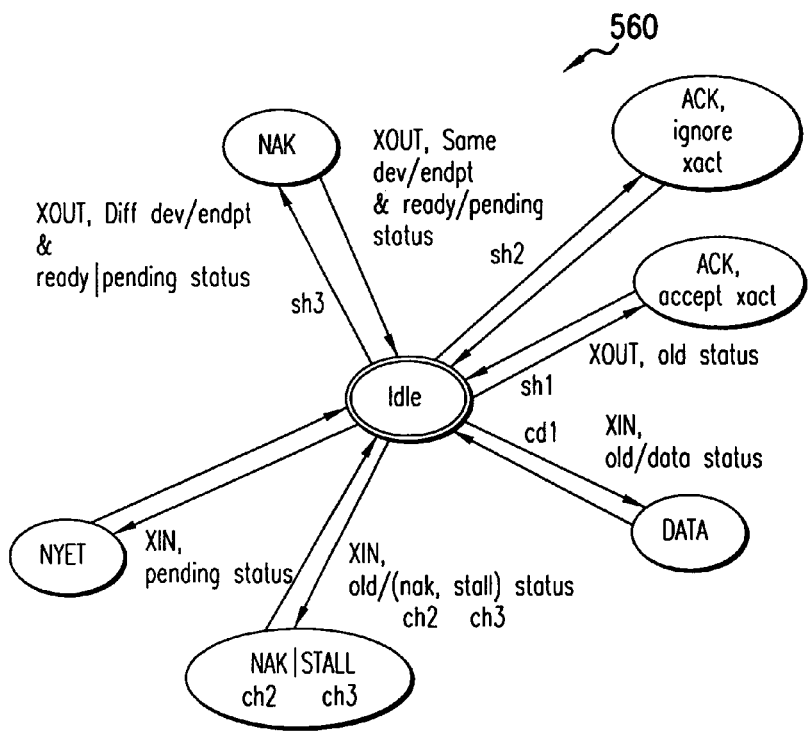

FIGS. 5*a* & 5*b* illustrate state machine diagrams for a host controller and a hub, respectively, performing another transfer in accordance with this invention, specifically a split in bulk/control transfer. Process 500 and process 560 shows the state machine for a host controller and a hub, respectively. Process 500 includes start split transaction, having a token phase (XOUT), which is repeated up to three times by the host controller when timeouts occur during transaction attempts between the host controller and the hub. In response to the start split transaction, process 560 will either acknowledge and accept the transaction (ACK, accept xact), respond to a host controller retry after a communication failure of a hub handshake to the host controller (ACK, ignore xact), or request a host controller retry due to a lack of space to hold the start transaction information. Process 500 shows the host controller response to a complete split transaction (XIN) when the transaction between the hub and agent was successfully processed (Advance), received an indication that the endpoint is unable to function normally (STALL), was not yet completed by the hub or agent (NYET), ignores data received from the hub because it is corrupted, or the XIN or its response had some communication failure and resulted in up to three timeouts between the host controller and hub. In response to the complete split transaction, process 560 will either indicate that the transaction between the hub and the agent has not finished (NYET) or will provide an indication (NAK, STALL) of what transpired during the transaction between the hub and the endpoint, or send the data received from the agent by the hub to the host controller.

Figure 6A:
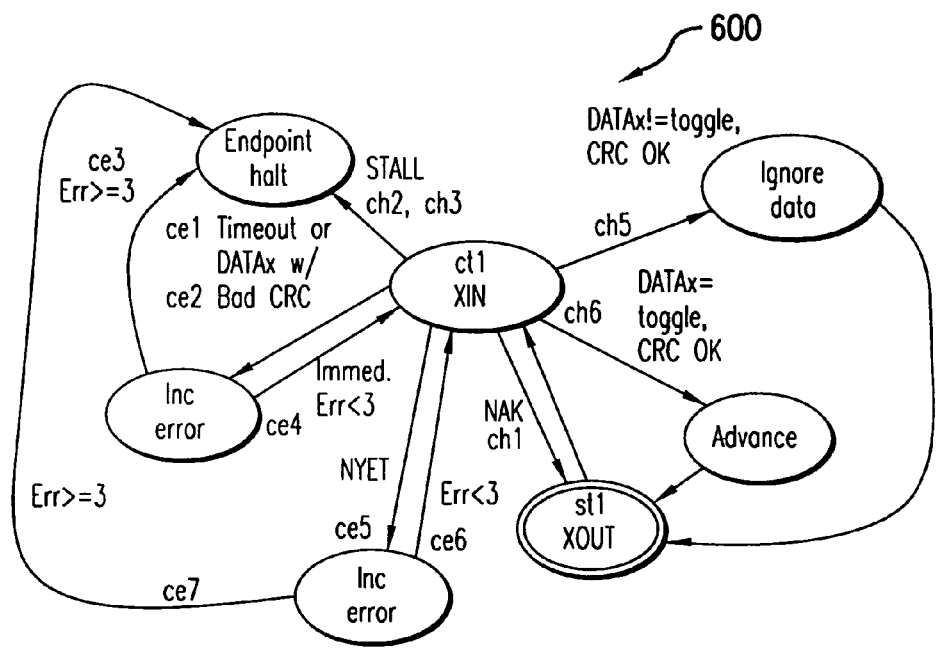
FIGS. 6a & 6b illustrate state machine diagrams for a host controller and a hub, respectively, performing another transfer in accordance with this invention.
Figure 6B:
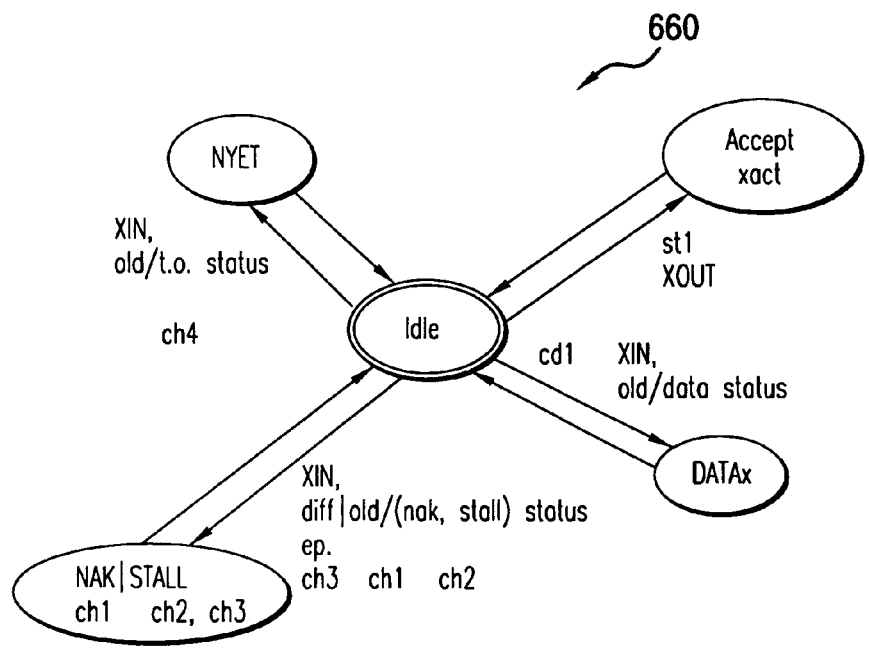

FIGS. 6*a* & 6*b* illustrate state machine diagrams for a host controller and a hub, respectively, performing another transfer in accordance with this invention, specifically a split in interrupt transfer. Process 600 and process 660 shows the state machine for a host controller and a hub, respectively. Process 600 includes a start split transaction, having a token phase (XOUT). In response to the start split transaction, process 660 will accept the transaction (accept xact). Process 600 shows the host response to a complete split transaction (XIN) when the transaction between the hub and agent was successfully processed (Advance), received an indication that the endpoint is not able to function normally (STALL), was not yet completed by the hub or agent (NYET), received a NAK from the agent (NAK), retries token phase if data received is an agent retry of the previous transaction request (ignore data), or the XIN or its response had some communication failure and resulted in up to three timeouts before the host controller gives up communicating with the agent. In response to the complete split transaction, process 660 will indicate that a timeout occurred when the hub was communicating with the agent (NYET), or the hub didn't received the start transaction for this request and had no corresponding response information (STALL) or provide an indication (NAK, STALL) of what transpired during the transaction between the hub and the agent, or send the data to the host controller.

Figure 7A:
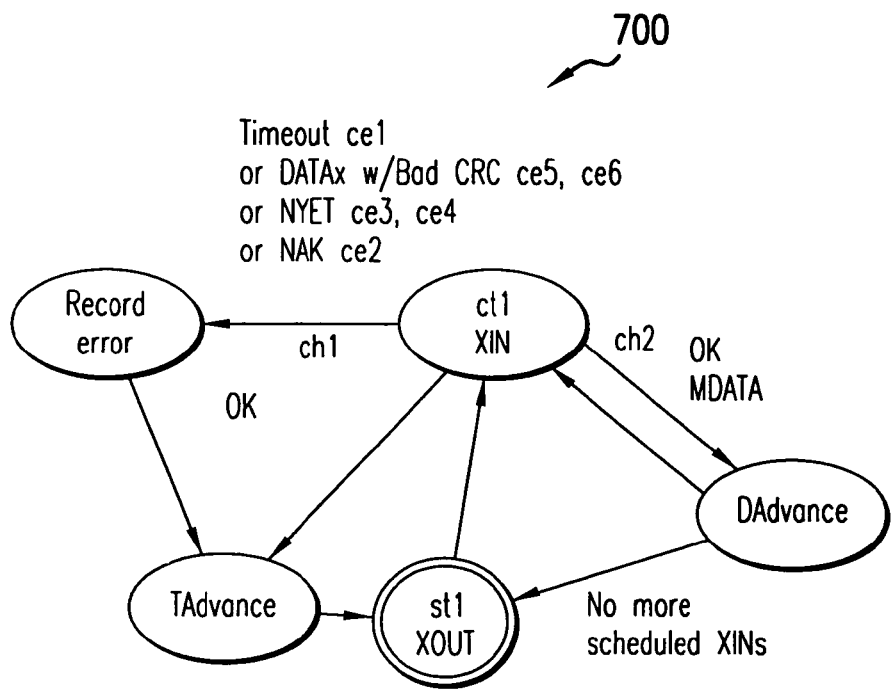
FIGS. 7a & 7b illustrate state machine diagrams for a host controller and a hub, respectively, performing another transfer in accordance with this invention.
Figure 7B:
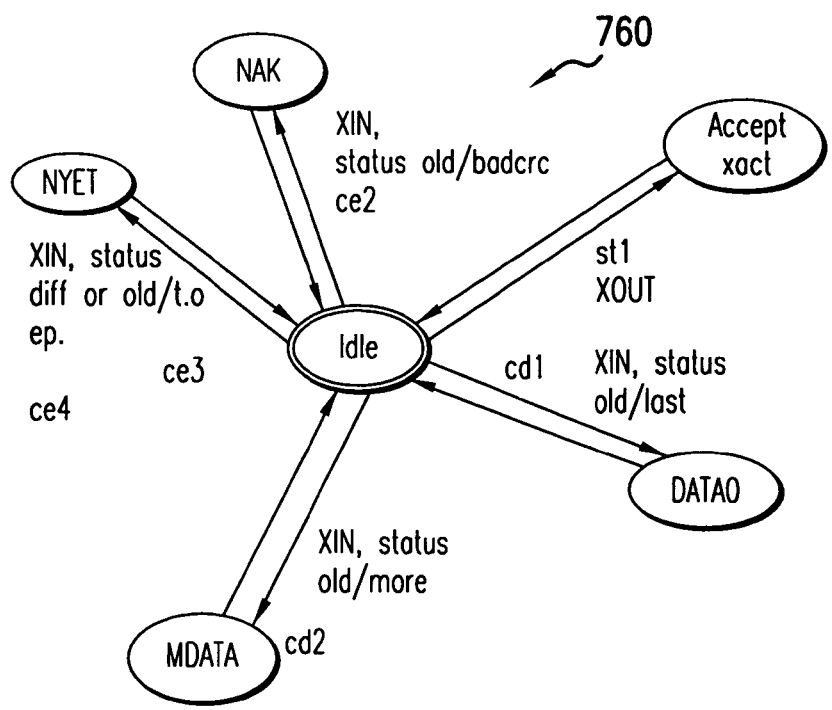

FIGS. 7*a* & 7*b* illustrate state machine diagrams for a host controller and a hub, respectively, performing another transfer in accordance with this invention, specifically a split in isochronous transfer. Process 700 and process 760 shows the state machine for a host controller and a hub, respectively. Process 700 includes a start split transaction, having a token phase (XOUT). In response to the start split transaction, process 760 will accept the transaction (accept xact). Process 700 shows the host response to a complete split transaction (XIN) when the transaction between the hub and agent was successfully processed and all the data has been returned (TAadvance) or there is more data to return (DAadvance) or an error occurred (record error) due to a communication failure between the host and hub (timeout or bad cyclic redundancy check) or the agent (NAK) or a hub problem with the agent (NYET). In response to the complete split transaction (XIN), process 660 will indicate that data received from the agent had a bad cyclic redundancy check (NAK) or the agent didn't respond (NYET) or the hub had no information about this complete-split, or send the data to the host controller either indicating all the data has been returned (DATA0) or more data is to be returned (MDATA).

It is useful at this point to summarize the description of the above protocol before describing the remaining apparatus and methods of the present invention. The protocol described above allows a host controller to transfer data to or receive data from an agent via a hub. The protocol allows the host controller to engage in a first transaction (start split transaction) in which a transfer request is communicated to the hub. After the host controller performs the first transaction, it may engage in an intermediate transaction with the same hub or another hub without waiting for the hub and agent to perform the transfer request (i.e., engage in the transfer of data to or from the agent). The intermediate transaction may include a transfer request for the agent, another agent on the same hub as the agent, or another agent on yet another hub. After the hub engages in the transfer of data to or from the agent, the host controller performs a complete split transaction (or second transaction) to get the result (e.g., data or handshake sent from the agent to the hub) of the transfer performed between the hub and the agent. By allowing the host controller the capacity to engage in an intermediate transaction, instead of waiting for the hub to perform the transfer request (or third transaction) with the agent, the effective throughput of a bus using a protocol in accordance with this invention can be significantly greater than buses which involve speed-shifting or which require the host controller to wait for the hub to perform the transfer with the agent before initiating another transfer.

While the above protocol defines the sequence of transactions involved in communicating data across a bus, it does not explicitly describe the timing for the transactions or transfers which will result in data being sent to or received from an agent. However, timing of transfers for agents is important because agents typically require data to be sent to or received from the host controller on a periodic (e.g., isochronous or interrupt) or asynchronous (e.g., bulk or control) basis. Additionally, while the above protocol allows a host controller to perform an intermediate transaction (or even multiple intermediate transactions) between the start split and the complete split transaction, the above protocol does not explicitly describe how transfer requests are stored in the hub and how the hub and agent perform transfer requests without requiring the host controller to wait for the transfer request to be performed before engaging in an intermediate transaction. The issues not addressed by the above description of the protocol, namely the timing of transfer requests and the processing (i.e., buffering and performance) of transfer requests by a hub, are addressed by the following descriptions of methods and apparatus in accordance with the present invention. The present invention includes a method and apparatus for scheduling transfers of data to and from an agent and a method and apparatus for processing transfer requests at a hub. The method and apparatus for scheduling transfers of data is described first and then the method and apparatus for buffering and performing transfer requests is described second.

Referring again to FIG. 1, the process of scheduling transfers of data first begins when system 102 performs configuration for agents attached to the bus of the system. Configuration can occur upon system initialization or boot-up or when an agent is attached to the bus after initialization. The scheduling of data transfers depends on the transfer type associated with an agent (or an endpoint of an agent) and the amount of data involved in the transfer. The manner in which agents having associated periodic transfers, such as isochronous and interrupt, are handled is described first, below, and then the manner in which agents having associated asynchronous transfers, such as bulk and control, are handled is described next.

During the process of configuration, each endpoint of each agent informs the system of the endpoint's associated maximum data payload size and transfer type (e.g., isochronous in/out, interrupt, bulk, control). The manner in and device by which each agent informs the system is well understood by those of ordinary skill in the art and need not be described here. The maximum data payload size is the largest amount of data that a transfer to or from an agent will entail. The system relays the data payload size and the transfer type to the host controller. The manner in which the system relays the size and transfer type to the host controller is well understood by those of ordinary skill in the art and need not be described here. The host controller uses the aforementioned two pieces of information associated with each endpoint to generate a budget list for the periodic transfers of the endpoints. In alternate embodiment, a software driver such as the host controller driver or even a hardware driver can generate the budget list and perform the scheduling operations described below. The budget list gives the earliest time that a transfer (sending or receiving a data packet) may occur as well as the latest time that a result associated with the transfer may be available. The earliest time that a transfer can occur depends on the amount of time taken up by each of the previous transfers assuming that the previous transfers happened under the best of circumstances (defined below). The latest time that a result associated with a transfer may be available depends upon the amount of time taken up by each of the previous transfers assuming that previous transfers happened under the worst circumstances (defined below) and the time required for the transfer under the worst circumstances. The earliest time that a transfer can occur is important because the host controller needs to have the transfer request buffered at the hub before that time so that as soon as the hub finishes the transfer request that is ahead of the buffered request the hub can turn its attention to the buffered transfer request. The latest time that a result associated with the transfer may be available is important because after the latest time it is substantially certain that the result will be available for the host controller to retrieve. If the host controller were to try to retrieve the result from the hub before the latest time, meaning that the result is not available yet, a less efficient protocol employing multiple retrievals would be required.

Transfers happen under the best of circumstances when each transfer involves the maximum data payload and there is substantially no bit-stuffing. Transfers happen under the worst of circumstances when each transfer involves maximum data payload and there is maximum bit-stuffing. Bit-stuffing occurs according to an embodiment of the present invention because the signals on the bus obey non-return-to-zero (NRZ) signaling. According to an embodiment of the present invention, bit-stuffing may increase the size of the maximum data payload by 16%. While in an embodiment, the best circumstances and the worst circumstances have been defined in terms of bit-stuffing, it should be apparent that in alternative embodiments the circumstances can be described in terms of other things that can expand or decrease the size (or time) of transfers, or generate delays. The generation of a budget list in accordance with the present invention will now be described. While one way of generating a budget list is described herein, it should be apparent that the spirit and scope of the present invention encompasses other possible ways. A budget list is a list of the allowable periodic transactions that can occur in a particular frame template. A frame is a continuously occurring period of time defined as part of the bus specification that is sufficient to provide for one or more transactions. In an embodiment, a 1 millisecond time period is defined for a frame. A different budget list is constructed for each frame that has a different set of allowable periodic transactions. A frame template is a description of a particular periodically repeating frame that provides for some maximum number of transactions, each transaction having some maximum data payload. A frame contains some number of transactions of some actual data payload, while a frame template describes a potential budgeted frame. Each budget list has an associated best case information and an associated worst case information. The best case information describes the situation in which each transaction in the frame template occurs under the best circumstances. In an alternative embodiment, transfers rather than transactions are represented by the best case information and worst case information.

FIG. 8a illustrates a diagram for a best case frame template 800 in accordance with the present invention. Block 805 represents the transfer associated with a first endpoint, where the transfer happens under the best case. Block 810 represents the transfer associated with a second endpoint, where the transfer happens under the best case. The remaining blocks 815-835 represent similar best case transfers for other endpoints configured by the system. The worst case information describes the situation in which each transfer in the frame template occurs under the worst circumstances. FIG. 8b illustrates a diagram for a worst case frame template 850 in accordance with the present invention. Block 855 represents the transfer associated with the first endpoint, where the transfer happens under the worst case. Block 860 represents the transfer associated with the second endpoint, where the transfer happens under the worst case. The remaining blocks 865-885 represent similar worst case transfers for other endpoints configured by the system. It should be apparent that the relative sizes of the blocks are only meant for purposes of illustration.

The significance of best case frame template 800 and the worst case frame template 850 will now be explained by examining blocks 805, 810, 855 and 860. Blocks 805 and blocks 855 represent the best case and worst case transfer, respectively, for the first endpoint. The earliest that the transfer for the first endpoint can finish is Ta. The latest that the transfer for the first endpoint can finish is Tb. The foregoing suggests that the transfer associated with the second endpoint can begin as early as time Ta or begin as late as time Tb. Blocks 810 and 860 represent the best case and worst case transfer times, respectively, for the second endpoint. The earliest that the transfer for the second endpoint can end is Tc. The latest that the transfer for the second endpoint can finish is Td. The foregoing suggests that the information necessary for the second transaction must be available to the hub before time Ta and any result due to the first transfer is substantially certain to be available after time Tb. Furthermore, it should be apparent that scheduling of a transfer depends on the time required to perform each of the previous transfer requests. Additionally, it should be apparent that the scheduling of the complete-split transaction will depend on the time to perform the present transfer request, if any, associated with a start-split transaction.

Frame template 800 and frame template 850 are frame templates that are representative of a frame between the hub and the agent (hub-agent or classic frame). According to an embodiment of the present invention, the host controller and the hub have another frame that is a fraction of the size (microframe) of the classic frame. More specifically, in an embodiment, eight microframes are equivalent to a single classic frame. Since the host controller and the hub communicate using microframes and since a transfer request before reaching the hub starts as a start split transaction, it is useful to describe the time for performing the start split transaction in terms of microframes. Similarly it is useful to describe the time for performing the complete split transaction in terms of microframes. With regards to the start time for a start split transaction, according to an embodiment, a start split transaction should occur one microframe before the microframe in which the transfer between the hub and agent can occur according to the best case frame. With regards to the start time for a complete split transaction, according to an embodiment, a complete split transaction should occur one microframe after the microframe in which the transfer of the associated start split transaction can finish according to the worst case frame. According to an embodiment of the present invention, the host controller uses the best case frame and the worst case frame for each frame template to create a start-split vector and a complete-split vector for each endpoint in each frame template. The start-split vector contains a value indicative of the microframe in which the start split transaction for an endpoint should occur during a classic frame. According to an embodiment, start-split vector has values ranging from −1 to 6. The complete-split vector contains a value indicative of the microframe in which the complete split transaction for an endpoint should occur during a classic frame. According to an embodiment, the complete-split vector has values ranging from 1 to 8.

When host controller 110 is tasked by host controller driver 105 to perform a transfer in a particular frame for a particular endpoint, host controller 110 examines the best case vector that is associated with the endpoint and the frame template that corresponds to the particular frame. The value in the start-split vector for a given endpoint and frame template indicates the microframe at which a start split transaction is to be performed. Similarly, host controller 110 examines the complete-split case vector to determine the microframe at which a complete split transaction is to be performed.

Figure 9:
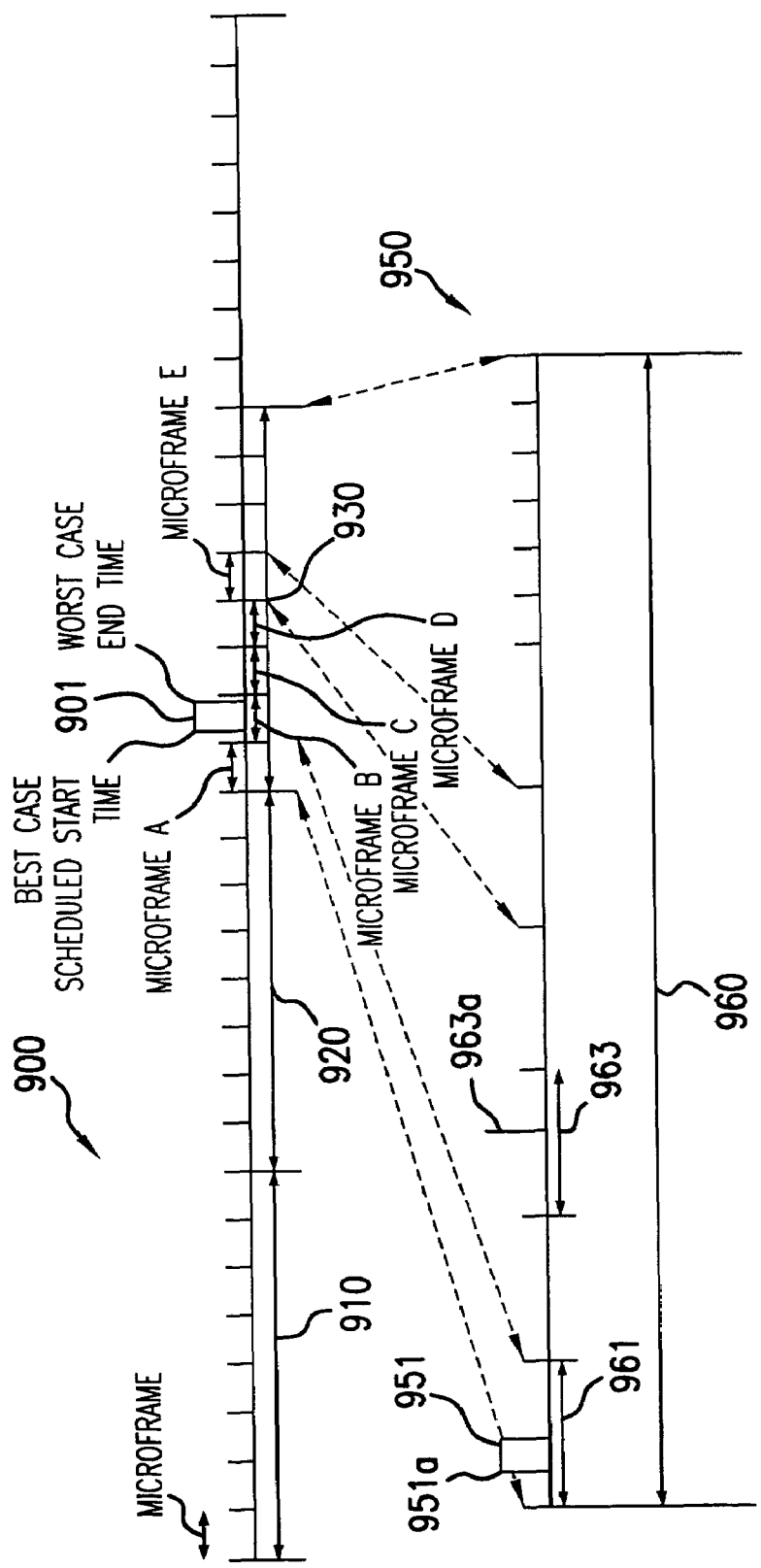
FIG. 9 illustrate timing diagrams for host controller-hub transactions and hub-agent transactions.

FIG. 9 includes a sequence of hub-agent frames (or classic frames) 900 and a host controller-hub frame 950. Frames 900 include frames 910-930. Frame 930 has a transfer 901 which is scheduled to start in microframe B and is scheduled to end in microframe B. In this illustration, transfer 901 is an isochronous out transfer, but it should be apparent that other transfers can be given a similar representation. Frame 950 includes frame 960 which has subframes 961 and 963. While transfer 901 is scheduled to occur in hub 120 in microframe B and end in microframe B (i.e., in the hub-agent time frame represented by frames 900), the associated start-split transaction occurs in frame 961 and the associated complete-split transaction occurs in frame 963. In the host controller-hub time frame represented by frame 950, the associated start-split transaction occurs at time 951a sometime in subframe 961 and the associated complete-split transaction occurs at time 963 sometime in subframe 963. Transfer 951 represents transfer 901 in the host controller-hub time frame. Other transfers and transactions can also occur in subframes 961 and 963. It should be apparent from FIG. 9 that subframes 962-3 are available for other transfers and transactions with other agents.

While the above description has generally been presented in the context of periodic transactions, the invention is not limited to periodic transaction but also includes asynchronous transfers such as the bulk and control transfers described above. According to an embodiment of the present invention, ninety percent of a classic frame is set aside for periodic transfers. Asynchronous transfers will occur at the earliest time there is space available for them on the bus between the hub and the agent. The hub will accept a transaction during a microframe when it has space available to hold the start-split transaction until it can be issued on the classic bus (i.e., between the hub and an agent). Then the hub will issue the transaction during a classic frame when it has no other pending periodic transactions. Once the hub has accepted a start-split, the host controller will later issue a complete-split transaction to retrieve the results from the hub for that transaction on the classic bus. The host controller driver issues an asynchronous split-transaction to the hub whenever it has no other periodic transactions to issue during a microframe. The buffering provided by the hub for bulk/control transactions is distinct and separate from the buffering provided by the hub for periodic transactions.

A method and apparatus for buffering periodic transfer requests and processing them in accordance with this invention will now be described. FIG. 1e shows in greater detail hub 120 of FIG. 1a. According to an embodiment, hub 120 of the present invention includes a host-controller-hub (or high-speed hub) controller 180, a hub-agent (or low-speed) hub controller 181, a memory 182, a control unit 183, a clock 183a, a repeater 184, a routing logic 185, and ports 185-189. The controller 180 performs split transactions between hub 120 and host controller 110. Whenever a start-split transaction is received by controller 180 from the host controller 110, controller 180 records the current microframe number in memory 182 as a timestamp for the transaction. An alternate embodiment would record the microframe number as a timestamp in the state records to separate one group of transactions received by the hub during one microframe from those transactions received during another microframe. Controller 181 performs transfers between the hub and one or more agents. The transfers performed by controller 181 are received during start split transactions performed between controller 180 and host controller 110. Memory 182 is coupled to both high-speed hub controller 180 as well as low-speed hub controller 181. Memory includes a pipeline with a plurality of stages. According to an embodiment, the pipeline has five stages. Each stage of the pipeline corresponds to a microframe as defined above. Each stage of the pipeline has a plurality of transaction states (or transaction records). According to an embodiment, a stage of the pipeline has 19 or fewer transaction states or records. Each stage stores records representative of transfers to be performed. A record may have several fields, such as device and endpoint address, direction of transfer, transfer type, status, and data reference. Status indicates whether the transfer is not ready (prevent the low-speed hub controller from performing it), pending (waiting for execution) or ready (has been performed by the low-speed hub controller). The data reference is a pointer to a starting address in memory for data received (i.e., in transfer) from the agent or data to be sent to the agent (e.g., out transfer).

Hub 120 includes control unit 183 and clock 183a coupled to control unit 183. According to an embodiment, clock 183a generates a microframe indication; i.e., that one-eighth of the time duration of the classic frame has elapsed. Control unit 183 is coupled to memory 182 and monitors the records in the stages and prevents the performance of a transfer by the low-speed hub controller 181 if the time at which the transfer is to begin execution at the low-speed hub controller 181 is past the time the transfer was scheduled to be performed or to have completed performance. Specifically, according to an embodiment, a record whose associated time stamp indicates that it was received by controller 180 from host controller 110 one microframe earlier, is set to a pending status to allow the low-speed hub controller 181 to issue the transaction on the classic bus. A record whose associated timestamp indicates that it was received more than three microframes before the current microframe indication but has not yet been performed by low speed hub controller 181 is marked as old to prepare it for a subsequent corresponding complete-split transaction by the high speed hub controller 180. A record whose associated timestamp indicates that it was received more than four microframes before the current microframe indication but has not yet been performed or is currently being performed by low-speed hub controller 181 is aborted and removed from the pipeline. Clock 183a is also coupled to the low-speed hub controller 181. Controller 181 sequences in order through the periodic transaction records that are marked as pending. According to an embodiment, controller sequences 181 through the pending records received in the earliest microframe before proceeding to the records received in the next earliest received microframe and so on. According to an embodiment, controller 181 proceeds to the next earliest received microframe when control unit 181 receives a microframe indication. When control unit 181 receives a microframe indication it changes the status of the transfers in the next earliest received microframe from not ready to pending, and flushes out the transfers that are stale as described above. To perform a transfer controller 181 transfers data to routing logic 185 which gives controller 181 access to one of the ports 186-189. Routing logic 185 gives an agent access to either repeater 184 or controller 181 to allow the transfer of data at a high data rate or a low data rate depending on the agent's configured data rate. Repeater 184 is coupled to controller 180 and routing logic 185. Repeater 184 repeats signals received from (or destined to) controller 180 and destined to (or received from) a high speed agent coupled to one of ports 186-189.

While sequencing through the pending records received in the earliest microframe, controller 181 operates in accordance with the following rules. First, after performing a transfer between controller 181 and the agent, controller 181 will retrieve the next transaction record and perform the next pending isochronous or interrupt transfer. Second, if there is no pending isochronous or interrupt transfers, controller 181 will perform a pending bulk/control transfer. Third, if there is no pending bulk/control transfer, controller 181 waits for the high-speed hub controller 180 to indicate a pending bulk/control or isochronous or interrupt transfer.

When the low-speed hub controller performs a transfer a result is stored in the memory 182. The result may be either a handshake or data received from the agent. Transfers which have been performed have their status changed by the low-speed hub controller 181 to ready and their records are made available to the high-speed hub controller 180. When a complete split transaction is received by the high-speed hub controller 180, the high-speed hub controller 180 examines the record of the most recently performed transfer with the same addressing information and sends a response back to the host controller 110 based on the result of the most recently performed transfer. If the complete split transaction is not inquiring about a transaction with the same addressing information, the high-speed hub controller 180 will respond back with a NYET.

Thus, a method and apparatus for scheduling transfers between a host controller and a hub has been described. Additionally, a method and apparatus for buffering and performing transfers at a hub has been described. Although the present invention has been described with reference to specific exemplary embodiments, it will be evident to one of ordinary skill in the art that various modifications and changes may be made to these embodiments without departing from the broader spirit and scope the invention as set forth in the claims. Accordingly, the specification and drawings are to be regarded in an illustrative rather than a restrictive sense.

What is claimed is:

1. A system comprising:
    a host controller to be coupled to a hub and a first agent, said host controller to perform a split transaction to transfer data between the host controller and the first agent; and
    a device driver to operate the host controller to perform a first transaction of the split transaction and a second transaction of the split transaction between the host controller and the hub, said second transaction being different than said first transaction;
    wherein the host controller is to perform a third transaction with another agent while an agent transaction with the first agent is being performed by the hub.

2. The system of claim 1, wherein the first transaction and second transaction are performed at a first communication speed.

3. The system of claim 1, wherein the third transaction is performed at a second communication speed.

4. The system of claim 1, wherein the first transaction and second transaction are performed in accordance with a first protocol.

5. The system of claim 4, wherein the third transaction is performed in accordance with a second protocol.

6. The system of claim 1, wherein the host controller is to send to the hub, during the first transaction, a first packet including agent identification information.

7. The system of claim 6, wherein the host controller is to send to the hub, during the second transaction, a second packet.

8. The system of claim 1, wherein the host controller is to receive an acknowledgement from the hub during the second transaction.

9. A device comprising:
    a hub controller to be coupled to a host controller and to an agent, said hub controller to perform a split transaction with the host controller to effect a transfer of data between the host controller and the agent;
    wherein the hub controller is to perform a first transaction of the split transaction and a second transaction of the split transaction with the host controller, said second transaction being different than said first transaction;
    wherein the hub controller is to perform an agent transaction with the agent based on the first transaction;
    wherein the second transaction is based on the agent transaction.

10. The device of claim 9, wherein the first transaction and second transaction are performed at a first communication speed.

11. The device of claim 10, wherein the agent transaction is performed at a second communication speed.

12. The device of claim 9, wherein the first transaction and second transaction are performed in accordance with a first protocol.

13. The device of claim 12, wherein the agent transaction is performed in accordance with a second protocol.

14. The device of claim 9, wherein the hub controller is to receive a first packet from the host controller during the first transaction, the first packet including agent identification information, and the hub controller is to send an acknowledgement to the host controller during the second transaction.

15. The device of claim 9, wherein the hub controller is to receive a first packet from the host controller during the second transaction, and the hub controller is to send a second packet to the host controller during the second transaction, the second packet being based on data to be received from the host controller.

* * * * *